Feb. 24, 1970  C. STANG, JR., ET AL  3,496,951
CONVERTIBLE CONTROL MANIFOLD ASSEMBLY
Filed July 31, 1963  3 Sheets-Sheet 2

INVENTORS
Charles Stang, Jr.
Herbert J. Schlachter
BY
Harness, Dickey & Pierce
ATTORNEYS.

Feb. 24, 1970   C. STANG, JR., ET AL   3,496,951
CONVERTIBLE CONTROL MANIFOLD ASSEMBLY
Filed July 31, 1963   3 Sheets-Sheet 3

INVENTORS.
Charles Stang, Jr.
Herbert J. Schlachter.
BY
Harness, Dickey & Pierce
ATTORNEYS.

United States Patent Office 3,496,951
Patented Feb. 24, 1970

1

3,496,951
CONVERTIBLE CONTROL MANIFOLD ASSEMBLY
Charles Stang, Jr., and Herbert J. Schlachter, Detroit, Mich., assignors to Maxitrol Company, Southfield, Mich., a corporation of Michigan
Filed July 31, 1963, Ser. No. 298,949
Int. Cl. F23d *23/00, 13/46;* F16k *31/02*
U.S. Cl. 137—66                                16 Claims

ABSTRACT OF THE DISCLOSURE

A control manifold assembly for use in conjunction with gas-fired furnaces, boilers or the like. The assembly incorporates a pressure regulator valve and an automatic shut-off valve, each having interchangeable subassemblies providing for variation in the type of control.

---

This invention relates to valves, and more particularly to control manifold assemblies for use in conjunction with gas-fired furnaces, boilers or the like.

It is an object of the invention to provide a novel and improved arrangement which combines several components of a control manifold assembly of this type in an integrated manner, and has interchangeable parts which permit variation in the type of control with a minimum of expense for material and labor.

It is a further object to provide an improved control manifold assembly of this character which is adapted to incorporate a modulating or a non-modulating type of gas regulator and an automatic temperature-responsive shutoff valve, and may also have means for connecting a plug-in type of pilot safety switch thereto.

It is a further object to provide an improved assembly of this character which may be adapted for use with full effectiveness at various gas inlet pressures.

Other objects, features, and advantages of the present invention will become apparent from the subsequent description, taken in conjunction with the accompanying drawings, in which:

FIGURE 4 is a top plan view of the cover for the automatic valve solenoid housing and the spring clip for supporting the safety pilot;

Figure 6:
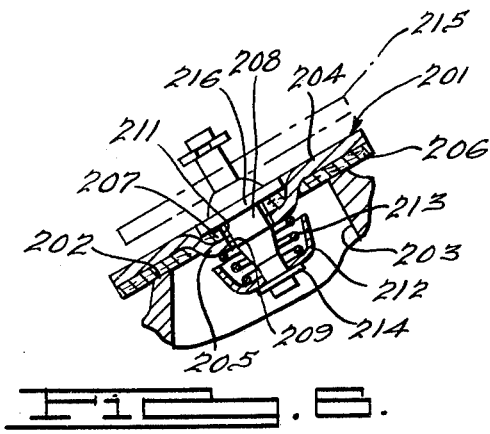
Figure 5:
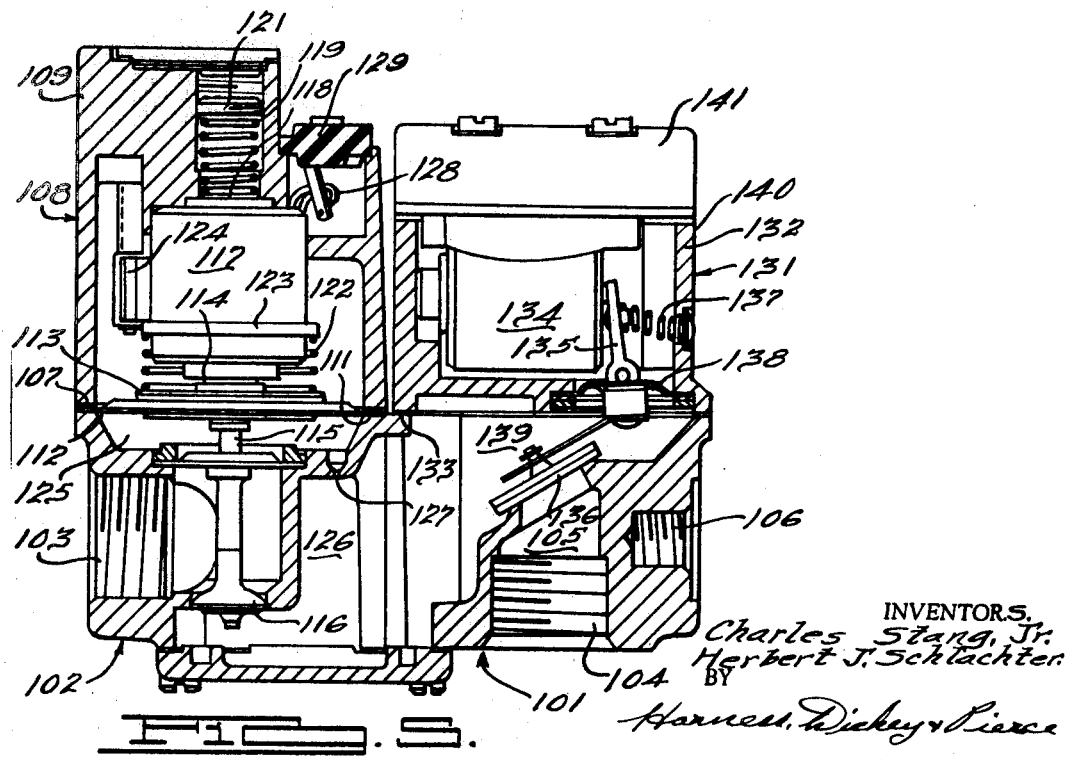

FIGURE 5 is a cross-sectional view in elevation of another embodiment of the invention in which a modulating type of regulator is incorporated with an automatic shutoff valve but without the supporting means for the safety pilot, the main housing ports being disposed at right angles; and FIGURE 6 is a fragmentary cross-sectional view of a modified form of shutoff valve adapted for use with higher inlet pressures.

Briefly, each of the illustrated embodiments of the invention comprises a unitary main housing which is of elongated shape and has an inlet port at one end and an outlet port at the other end, the housing being adapted for connection in a gas line. In one version of the main housing the inlet and outlet ports are aligned, while in the other they are at right angles. The portion of the

2 main housing adjacent the inlet port has a valve seat for a diaphragm-operated gas regulator valve of a balanced type, the diaphragm of the regulator being securable to the top of the main housing by the housing of a regulator top assembly. Two interchangeable types of regulator top assemblies may be provided, one type enclosing a spring for use with a non-modulating type of regulator, and the other enclosing a modulating mechanism including a coil, armature and springs.

The end of the main housing adjacent the outlet port encloses the valve seat of an automatic shutoff valve. An automatic valve top assembly is mountable on this portion of the main housing alongside the regulator top assembly, the automatic valve top assembly enclosing a solenoid and pivotally supporting a lever operable thereby extendable into the main housing for operating the automatic shutoff valve. In one version of the automatic valve top assembly, an extension is provided on the side facing away from the regulator assembly, this extension adapting the unit for supporting a plug-in type of automatic pilot safety switch. Another and interchangeable automatic valve assembly omits the extension. It is therefore possible to assemble any of various combinations for use in individual installations, such as a simple regulator combined with an automatic shutoff valve, a modulating regulator combined with an automatic shutoff valve, either of these together with a plug-in type of safety pilot, and any of the above with aligned or angularly disposed gas line ports.

Referring more particularly to the drawings, the assembly of FIGURES 1 to 4 is generally indicated at 11 and comprises a main housing generally indicated at 12, a regulator top assembly generally indicated at 13, and an automatic valve top assembly generally indicated at 14. Housing 12 is of elongated shape, having a regulator section 15 and an automatic valve section 16, these sections being indicated in FIGURE 1.

Regulator section 15 has an inlet port 17 at one end thereof, and an internal wall 18 having a vertical portion and a horizontal portion, the horizontal portion being provided with a regulator valve seat 19 of the poppet type. Valve seat 19 surrounds an apertured portion of wall 18 which connects an inlet chamber 21 and an outlet chamber 22 in housing section 15. A flexible member 23 is secured in a depressed portion 24 of housing section 15 by a ring 25 and serves to close the upper end of chamber 21. A bottom 26 is secured by bolts 27 and a gasket 28 to the underside of housing section 15, closing chamber 22.

The regulator comprises a valve member 29 movable between a position spaced below valve seat 19 and a position thereagainst. Member 29 is secured to a stem 31 by means of a fastener 32 at the lower end of the stem, the fastener urging valve member 29 against a spacer 33 mounted on stem 31 and secured to seal 23, as seen best in FIGURE 2.

The upper end of stem 31 is secured to a flexible diaphragm 34 which is responsive to outlet pressure changes for performing the regulating function. More particularly, the outer edge of diaphragm 34 is securable to a flat surface 35 at the top of housing section 15 which surrounds depressed portion 24. As will be later seen, diaphragm 34 is secured to the surface 35 by regulator assembly 13 or by an alternative regulator assembly when a modulating type of regulator is desired. In the embodiment of FIGURES 1 to 4, the housing 36 of assembly 13 is of irregular shape, having a lower surface engageable with the outer edge of diaphragm 34 to hold it against surface 35, and a downwardly facing chamber 37 which is vented by a port 38. An upward extension 39 is formed on housing 13, this extension enclosing a helical coil compression spring 41. A pair of nested flat cup-shaped members 42 and 43 are secured to the upper surface of diaphragm 34, as seen in FIGURE 2, member 42 being of larger diameter than member 43. Member 43 is adapted to retain the lower end of spring 41, the upper end of the spring being supported by an adjustable member 44 threadably mounted in a bore 45 within extension 39. A passage 46 connects chamber 22 with the chamber 47 formed between seal 23 and diaphragm 34. The above-described regulator valve is of a balanced type, this being especially advantageous under low inlet pressure conditions when modulation is desired, as will be seen with respect to the embodiment of FIGURE 5.

Automatic valve section 16 comprises an inlet chamber 48 and an outlet chamber 49, chamber 48 being contiguous with chamber 22 of section 15, with chamber 49 leading to an outlet port 51 at the end of section 16, ports 17 and 51 being aligned to facilitate in-line mounting of assembly 11 in a gas pipe line. An inclined wall 52 separates chambers 48 and 49, this wall having a raised valve seat 53 facing chamber 48 and surrounding a passage 54 which connects chambers 48 and 49.

Figure 1:
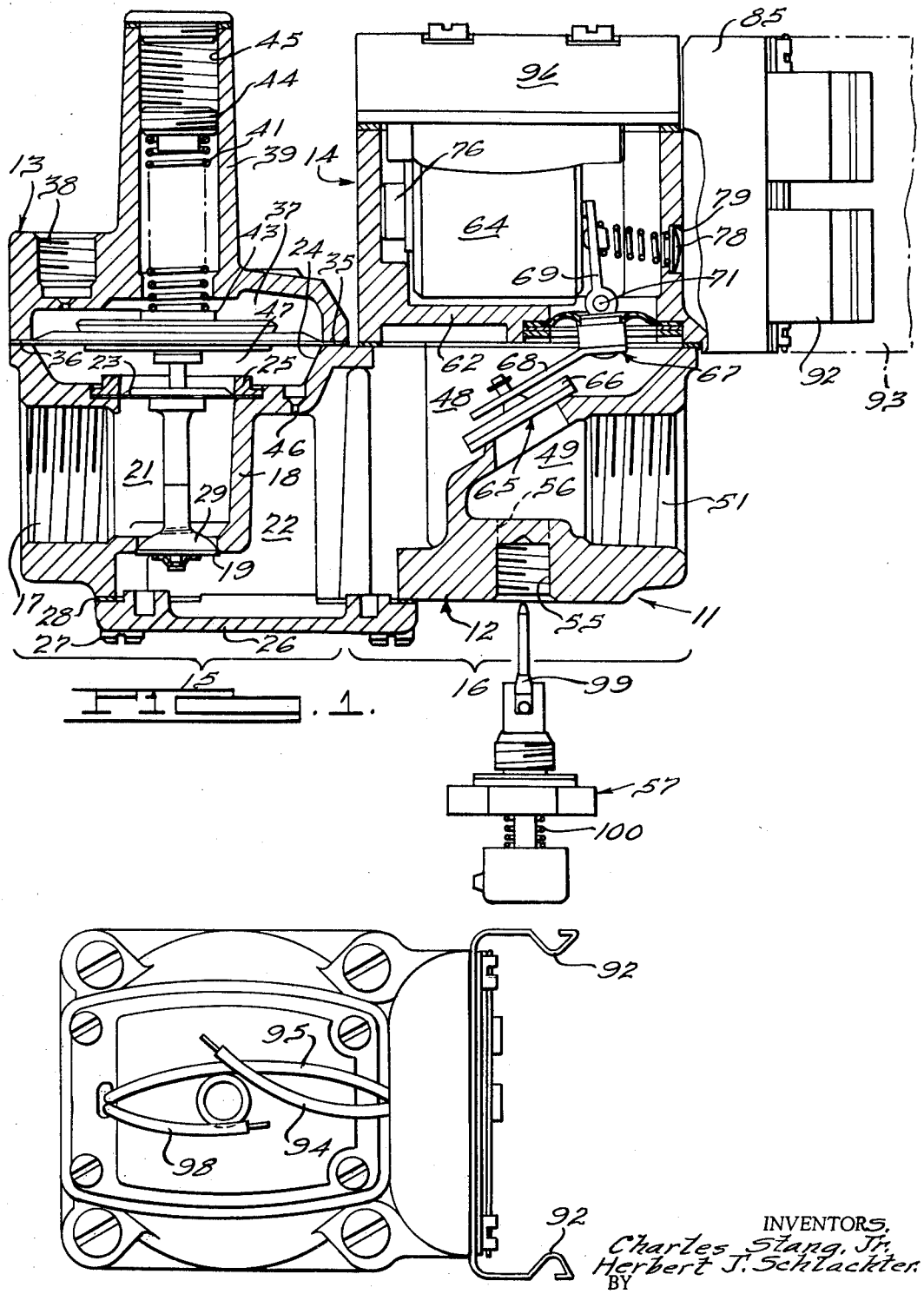
FIGURE 1 is a cross-sectional view in elevation of one embodiment of the invention, incorporating a non-modulating gas regulator, an automatic shutoff valve with provision for a plug-in type of pilot safety switch, and a straight-line port arrangement.
Figure 2:
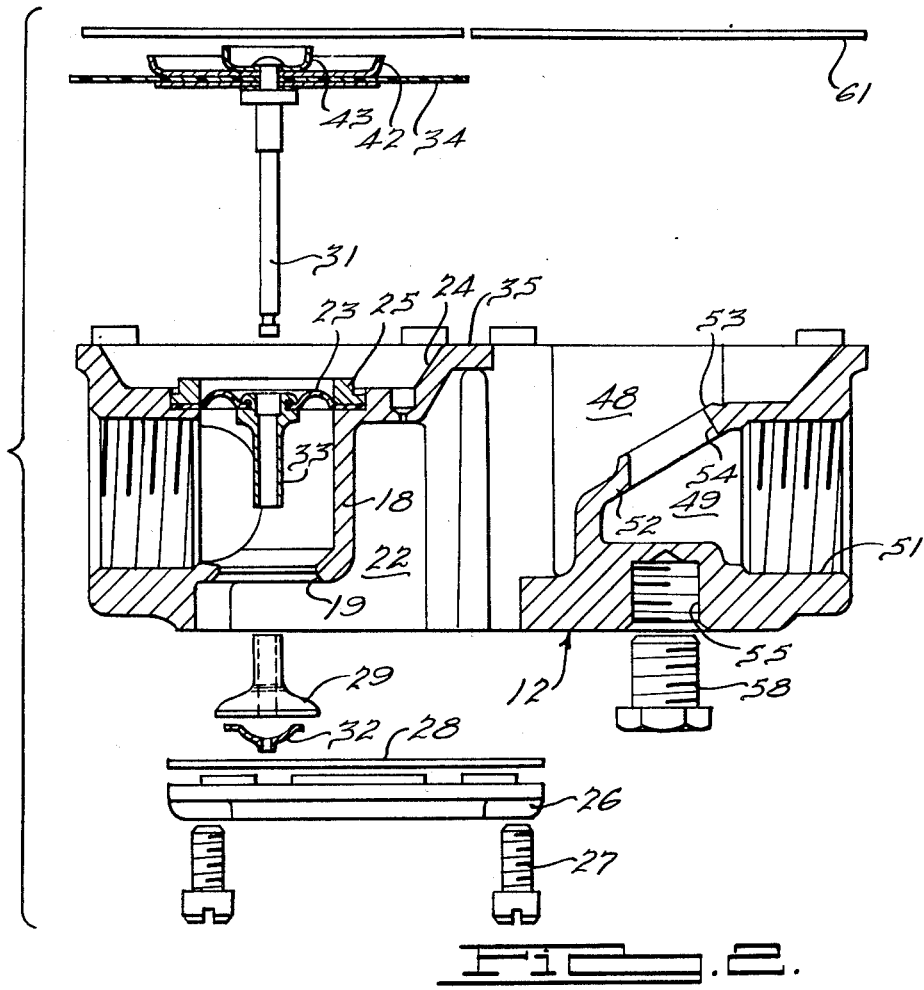
FIGURE 2 is an exploded cross-sectional view in elevation of the regulator portions of the assembly of FIGURE 1.

The underside of housing section 12 is provided with an upwardly extending threaded recess 55 which can, if desired, be drilled through as indicated in dot-dash lines at 56 in FIGURE 1 to connect with chamber 49. Recess 55 is for the purpose of providing a manual operator generally indicated at 57 for the automatic valve, as later described, but may be closed by a plug 58, shown in FIGURE 2, if no manual actuation is desired.

Figure 3:
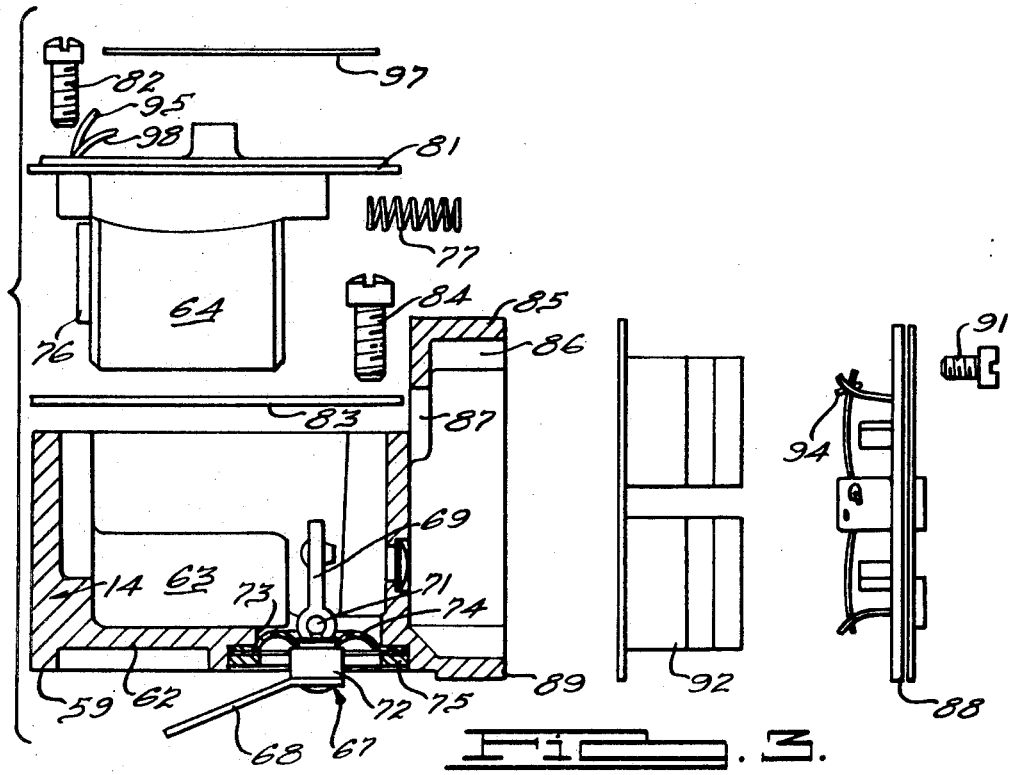
FIGURE 3 is an exploded cross-sectional view in elevation of the automatic valve control portions of the FIGURE 1 assembly.

The upper end of chamber 48 is closed by automatic valve assembly 14, the details of which are shown in FIGURE 3. Assembly 14 has a housing 59 with a flat underside engageable with the upper surface 35 of housing 12 through a gasket 61 (FIG. 2). Housing 14 is of generally rectangular shape, having a bottom wall 62 somewhat above the housing underside and a chamber 63 above bottom wall 62 for enclosing a solenoid 64 which operates the automatic valve. The valve itself is generally indicated at 65 and comprises a valve member 66 of disk-like shape movable between a position engaging valve seat 53 and a position spaced above the valve seat. Valve member 66 is mounted at one end of a lever generally indicated at 67 having an arm 68 disposed within chamber 48. Lever 67 has another arm 69 pivoted at 71 within chamber 63, a member 72 connecting arms 68 and 69 and extending through an apertured portion 73 of wall 62. A flexible diaphragm 74 is secured at its outer edge to the underside of wall 62 surrounding aperture 73 by a ring 75, seen in FIG. 3, the inner edge of the annular member 74 being secured to member 72 of arm 67.

Solenoid 64 is disposed on a horizontal axis within chamber 63, the solenoid having a central plunger or armature 76 movable to the right in FIGURES 1 and 3 in response to energization of the solenoid coil in order to urge arm 69 clockwise, thus lifting valve 65 from seat 53. A helical coil compression spring 77 is disposed between arm 69 and a plug 78 secured within an aperture 79 in the side wall of housing 14, spring 77 urging lever 67 counterclockwise to engage valve member 65 with valve seat 53. Deenergization of solenoid 64 will therefore cause the automatic valve to close.

A cover 81 is provided for housing 14, this cover having a plurality of bolts 82 for securing it to housing 14, a gasket 83 being disposed between cover 81 and housing 59. Bolts 84 are provided for securing housing 14 to housing 12.

A vertically enlarged extension 85 is formed on the side of housing 14 facing away from housing 13. Extension 85 has an outwardly facing recess 86 and an apertured portion 87 connecting recess 86 with the space immediately above cover 81 when the latter is assembled to housing 14. A socket subassembly 88 is secured to the outwardly facing edge 89 of extension 85 by bolts 91, and facing spring clips 92 are secured between subassembly 88 and surface 89 of extension 85. These spring clips are adapted to retain a plug-in type of automatic pilot safety switch indicated in dot-dash lines at 93 in FIGURE 1, wires 94 and 95 extending from subassembly 88 through recess 86 and aperture 87. A terminal block assembly 96, seen in FIGURE 1, is securable with a gasket 97 (FIG. 3), to cover 81, wire 95 and a wire 98 extending through an aperture in cover 81 for connection with the coil of solenoid 64. The automatic pilot safety switch 93 is of a known type which will break the electric circuit to solenoid 64 in the event of pilot flame failure causing automatic valve 65 to close.

Manual actuator 57 comprises a body threadably mountable in aperture 55 and slidably supporting a plunger 99 which is engageable with valve member 66 to urge the valve member away from valve seat 53, a spring 100 urging plunger 99 to its retracted position.

In operation, assembly 11 will be connected in a gas supply pipe line (not shown) which will ordinarily also be provided with a hand operated valve in advance of unit 11. Gas will flow from inlet port 17 through regulator section 15 and automatic pilot section 16 to outlet port 51. The outlet pressure from regulator section 15 will be controlled in accordance with the normal operation of the regulator, and valve 65 will close should a predetermined condition, such as a high temperature limit, be achieved. With safety pilot switch 93 connected in the circuit, automatic valve 65 will also be closed if the pilot flame is extinguished.

The embodiment of the invention shown in FIGURE 5 differs from that of FIGURES 1 to 4 in that regulator and automatic valve top assemblies are different, and further in that the main housing has an outlet port at the bottom instead of at the side. However, both the regulator and automatic valve top assemblies of the embodiment of FIGURE 5 are so designed as to be interchangeable with their counterpart assemblies shown in FIGURES 1 to 4.

Referring more particularly to FIGURE 5, the manifold assembly is generally indicated at 101 and comprises a main housing generally indicated at 102 having an inlet port 103 and an outlet port 104. Housing 102 is of elongated shape, as was housing 12, and has the same exterior dimensions and surface shapes, except for the fact that outlet port 104 extends downwardly from outlet chamber 105 of the automatic valve section of the housing. A threaded recess 106 extends inwardly from the side of housing 102, serving the same purpose as recess 55 in the first embodiment, i.e., it may be drilled through to provide for a manual operator (not shown).

The upper surface 107 of housing 102 is flat, and has the same shape as surface 35 of housing 12, the other components of housings 12 and 102 also being the same.

The regulator top assembly of FIGURE 5 is generally indicated at 108 and comprises a housing 109 having an open bottom surrounded by a bottom surface 111 which engages diaphragm 112 of the regulator, this diaphragm and its attached parts being constructed identically with those of the first embodiment of the invention. In other words, diaphragm 112 has an outer cup 113 and an inner cup 114 secured thereto, and a stem 115 extending downwardly and carrying the regulator valve member 116.

A modulating coil 117 is secured within housing 109, a plunger 118 being slidably disposed within coil 117 and urged downwardly by a helical coil compression spring 119. The upper end of spring 119 is supported by an adjustable member 121 threaded in the upper end of housing 109. The lower end of plunger 118 is disposed within cup 114, so that spring 119 urges valve member 116 toward an open position.

A helical coil compression spring 122 of substantially larger diameter than spring 119 surrounds the lower portion of coil 117 and extends downwardly therefrom, the lower end of spring 122 being received in outer cup 113. The upper end of spring 122 is supported by a ring-shaped member 123 surrounding coil 117, the vertical position of ring 123 being adjustable by means of an adjusting screw 124 mounted in housing 109.

Assembly 108 thus comprises a modulating attachment for the regulator. Current in coil 117 will tend to urge plunger 118 upwardly, counteracting the force of spring 119, the latter spring being termed a maximum standard force spring. Spring 122 is termed a minimum standard force spring, and when the force of spring 119 is completely counteracted by the upward force coil 117 on the plunger 118, spring 122 will determine the force on diaphragm 112 which balances the force in chamber 125 connected to outlet chamber 126 by passage 127. The amount of current in coil 117 will be controlled by a circuit (not shown) to which it is connected by wires 128 leading through an insulative member 129 in the upper portion of housing 109; this current being proportional to temperature so as to decrease the regulated outlet pressure as the temperature is raised. The regulator will of course perform its regulating function regardless of the setting of the modulator portion thereof.

The automatic valve top assembly of FIGURE 5 is generally indicated at 131 and comprises a housing 132 of generally rectangular shape and having an undersurface 133 of identical shape with the under-surface of housing 59 of assembly 14, and therefore securable interchangeably with assembly 14 to either main housing 12 or 102. A coil 134 is mounted within housing 132 and has an armature engageable with one end of a lever 135, the other end of the lever carrying automatic valve 136. A spring 137 for urging valve member 136 to a closed position, and a flexible diaphragm 138 for separating inlet chamber 139 of the automatic valve section of housing 102 from the interior of housing 132, are also provided.

The side 140 of housing 132 facing away from housing 109 does not carry an extension similar to extension 85 of the first embodiment. In other words, assembly 131 is for use in instances where it is not desired to attach a plug-in type of pilot valve switch. A terminal block assembly 141 is secured to the top of housing 132 as in the previous embodiment.

The operation of the embodiment of FIGURE 5 will be obvious from the above description, gas entering port 103 and flowing through the regulator and automatic valve sections of the assembly to outlet port 104.

It will also be apparent from the above description that there are eight possible variations of the interchangeable assemblies, as follows:

(1) Main housing 12, regulator top assembly 13, automatic valve top assembly 14.

(2) Main housing 12, regulator top assembly 108, automatic valve top assembly 14.

(3) Main housing 12, regulator top assembly 13, automatic valve top assembly 131.

(4) Main housing 12, regulator top assembly 108, automatic valve top assembly 131.

(5) Main housing 102, regulator top assembly 13, automatic valve top assembly 14.

(6) Main housing 102, regulator top assembly 108, automatic valve top assembly 14.

(7) Main housing 102, regulator top assembly 13, automatic valve top assembly 131.

(8) Main housing 102, regulator top assembly 108, automatic valve top assembly 131.

In addition, any of the above variations could be further varied by having either the manual operator for the automatic valve or no manual operator.

An extremely wide choice is thus provided for the many types of gas installations which may require either an ordinary or a modulating type of regulator, an automatic valve without pilot valve control or automatic valve with pilot valve control, and with the inlet and outlet ports either aligned or at right angles. This large number of variations is accomplished with the provision of a minimum number of interchangeable parts, thus greatly reducing the manufacturing costs and permitting any of the variations to be supplied quickly to the customer without the necessity of a large stock of parts.

FIGURE 6 shows a modified form of the automatic valve member which is especially adapted for use with high gas inlet pressures, enabling the solenoid to move the valve to its open position against such high pressures. The valve is generally indicated at 201 and is adapted to coact with a valve seat 202 surrounding a passage 203 which connects the inlet and outlet chambers (not designated) in the main housing.

Valve member 201 comprises a generally disk-like member 204 with a recessed central portion 205 and an annular fibrous seat-engaging main valve member 206 surrounding recess 205. A second annular fibrous member 207 is disposed within recess 205, and a stem 208 extends through apertures 209 and 211 in recess 205 and member 207 respectively.

A retaining cup 212 surrounds the end of stem 208 which projects into outlet passage 203. A spring 213 is disposed between cup 212 and recess 205, a shoulder 214 carried by stem 208 retaining cup 212 in position. The other end of stem 208 within the inlet chamber is adapted to be connected to a lever shown partially in dot-dash lines at 215, lever 215 being movable outwardly and to the left in FIGURE 6 to lift valve member 206 and seat 202. A secondary valve member 216 is secured to stem 208 and is engageable with the exposed surface of member 207; the latter may be termed a secondary valve seat. Apertures 209 and 211 are sufficiently wide to permit passage of gas from the inlet to the outlet chambers when secondary valve member 216 is lifted from secondary valve seat 207 against the urging of spring 213.

In operation of the valve of FIGURE 6, stem 208 will be lifted by lever 215 upwardly and to the left until the rim of cup 212 engages recessed portion 205 of pipe 204. During this movement, secondary valve member 216 will be lifted away from secondary valve seat 207. The movement will require relatively little force, since plate 201 is not being moved, and the effective pressure area of member 216 tending to hold it closed is relatively small. Gas will thus be permitted to flow into the outlet chamber, tending to equalize the pressures on both sides of the main valve. Continued force on stem 208 will therefore lift plate 204 and main valve member 206, the lifting force being transmitted through cup 212.

What is claimed is:

1. In a control manifold assembly for a gas line, a main housing having inlet and outlet ports, series-connected regulator and automatic valve seats in said main housing between said ports, a first regulator assembly comprising a housing detachably securable to said main housing and enclosing components of a non-modulating type of regulator for coaction with said regulator seat, a second regulator assembly comprising a housing interchangeable with the housing of said first regulator assembly for detachable connection to said main housing and enclosing components of a modulating type of regulator for coaction with said regulator seat, and an automatic valve assembly comprising a housing detachably connected to said main housing and enclosing components of an automatic valve for coaction with said automatic valve seat.

2. In a control manifold assembly for a gas line, a main housing having inlet and outlet ports, series-connected regulator and automatic valve seats in said main housing between said ports, a first regulator assembly comprising a housing detachably securable to said main housing and enclosing components of a non-modulating type of regulator for coaction with said regulator seat, a first automatic valve assembly comprising a housing detachably connectible to said main housing and enclosing automatic valve components for coaction with said automatic valve seat, and a second automatic valve assembly interchangeable with said first automatic valve assembly for detchable connection to said main housing and enclosing components of an automatic valve for co-action with said automatic valve seat, the housing of said second automatic valve assembly also carrying an extension adapted to receive a plug-in type of pilot safety switch, a socket sub-assembly on said extension, and wiring connecting said socket sub-assembly with certain of said automatic valve components.

3. A main housing for a gas control manifold adapted to receive a gas pressure regulator subassembly and a solenoid shut-off valve actuator subassembly, said housing comprising a substantially rectangular box like one piece body having a top face and a bottom face extending substantially parallel to the top face, said housing having an inlet at one end and an outlet at the other end, said housing comprising a pressure regulator section adjacent the inlet end and a shut-off valve section adjacent the outlet end, the bottom face of said housing in said pressure regulator section having an opening therein, a cover for said opening attached to the housing, the top face of said housing in said shut-off valve section having an opening therein, said bottom face opening and top face opening overlapping adjacent the longitudinal midplane of the housing whereby the interior of said housing between said inlet and outlet is accessible through at least one of said openings, said housing containing a pressure regulator valve seat accessible from said bottom opening and a shut-off valve seat accessible from said top opening, said housing having a pressure regulator aperture in the top face aligned with said pressure regulator valve seat, said housing having attachment means for mounting a pressure regulator valve housing and diaphragm subassembly on said top face over said aperture, said housing having attachment means for mounting a solenoid shut-off valve actuator subassembly on said top face over said top face opening.

4. The structure of claim 3 wherein said housing in said pressure regulator section has an L-shaped internal wall aligned with said inlet and said bottom opening and including said pressure regulator valve seat in a portion of said wall extending substantially parallel to said bottom face.

5. The structure of claim 3 wherein said housing in said shut-off valve section has an internal wall extending diagonally to said top and bottom face with the end thereof adjacent said bottom face being located adjacent to said pressure regulator section, said wall including said shut-off valve seat and being aligned with said top face opening.

6. The structure of claim 3 wherein said housing in said pressure regulator section has an L-shaped internal wall aligned with said inlet and said bottom opening and including said pressure regulator valve seat in a portion of said wall extending substantially parallel to said bottom face, said housing in said shut-off valve section having an internal wall extending diagonally to said top and bottom face with the end thereof adjacent said bottom face being located adjacent to said pressure regulator section, said wall including said shut-off valve seat and being aligned with said top face opening, said housing having an internal gas passage aligned with said openings connecting said valve seats.

7. The structure of claim 6 wherein said outlet includes a passage providing access to substantially the entire length of the bottom side of said diagonal wall.

8. The structure of claim 7 wherein said inlet and outlet are in alignment along a line substantially parallel to said top and bottom faces.

9. The structure of claim 8 wherein said inlet and outlet have axes that are substantially normal to each other.

10. In a control manifold assembly for insertion in a gas line, a main housing of elongated shape having an inlet port at one end and an outlet port at the other end, a regulator valve seat formed in a section of said main housing adjacent said inlet port, an automatic valve seat formed in a section of said housing adjacent said outlet port, an upwardly open regulator inlet chamber connected to said inlet port, a flexible member secured in said main housing and closing the upper end of said inlet chamber, a sleeve secured to a central portion of said member, a recessed upper portion on said main housing above said flexible member, a regulator diaphragm secured over said recessed portion, a stem secured to said regulator diaphragm and extending downwardly through said sleeve, a valve member secured to the lower end of said stem and coactable with said regulator valve seat, a regulator outlet chamber in said main housing in communication with the automatic valve seat, a fluid pressure connection between said outlet chamber and the chamber formed below said diaphragm, a regulator top assembly comprising a housing securable to said main housing above said regulator diaphragm, a compression spring within said regulator top assembly housing and connected to the top of said diaphragm to bias the valve member toward open position, a second regulator top assembly interchangeable with said first-mentioned regulator top assembly for detachable connection to said main housing above said regulator diaphragm, a modulating coil in said second regulator top assembly housing, and a plunger controllable by the current in said coil and engageable with the top of said diaphragm.

11. In a control manifold assembly for insertion in a gas line, a one piece member forming a main housing of elongated shape having an inlet port at one end and an outlet port at the other ened, a regulator valve seat formed in a section of said main housing adjacent said inlet port, an automatic valve seat formed in a section of said housing adjacent said outlet port, an upwardly open regulator inlet chamber connected to said inlet port, a flexible member secured in said main housing and closing the upper end of said inlet chamber, a sleeve secured to a central portion of said member, a recessed upper portion on said main housing above said flexible member, a regulator diaphragm secured over said recessed portion, a stem secured to said regulator diaphragm and extending downwardly through said sleeve, a valve member secured to the lower end of said stem and coactable with said regulator valve seat, a regulator outlet chamber in said main housing in communication with said automatic valve seat, a fluid pressure connection between said outlet chamber and the chamber formed below said diaphragm, a regulator top assembly comprising a housing securable to said main housing above said regulator diaphragm, a compression spring within said regulator top assembly housing and connected to the top of said diaphragm to bias the valve member toward open position, an automatic valve top assembly comprising a housing detachably securable to the top of said main housing alongside said regulator top assembly, an automatic valve member pivotally supported by said valve top housing and extending therebelow for coaction with said automatic valve seat, an automatic valve inlet chamber in said main housing contiguous with said regulator outlet chamber, means carried by said automatic valve top assembly housing for sealing the interior of said last-mentioned housing from said automatic valve inlet chamber, a coil enclosed by said automatic valve top assembly housing, an armature within said coil for urging said automatic valve to its open position in response to coil energization, and a spring in said automatic valve top assembly housing urging said automatic valve member to its closed position.

12. A main housing for a gas control manifold and adapted to receive a gas pressure regulator subassembly and a solenoid valve actuator subassembly, said housing comprising a substantially rectangular box-like one piece body having a top, bottom, two ends, and two sides, said housing having an inlet at one end and an outlet at the other end, said housing adjacent said inlet end having a substantially right angle shaped internal wall and adjacent said outlet having a diagonally disposed internal wall sloping from said top downwardly toward said angle shaped wall, said housing having an internal cavity connecting said walls, said two walls separating said inlet from said outlet, said angle shaped wall having a valve seat for a pressure regulator valve and said diagonal wall having a valve seat for a solenoid actuated shut-off valve, said top of said housing being adapted to receive a pressure regulator subassembly in operative relationship to said pressure regulator valve seat and a solenoid valve actuator subassembly in operative relationship to said shut-off valve, said top and bottom having open portions in rectilinear alignment with said seats.

13. A fluid control manifold comprising a housing, a pressure regulator subassembly and a solenoid valve actuator subassembly, said housing comprising a one piece elongated body having a top and bottom and an inlet and outlet for the flow of fluid and internal fluid passage means for flow of fluid from the inlet to the outlet, said housing including first and second longitudinally spaced internal walls extending across said fluid passage means each of which has a valve seat to receive a valve for controlling flow through said fluid passage means, the space inside said housing between said valve seats and said top being substantially open and adapted to receive valve operating mechanism, the space inside said housing between said valve seats and said bottom being open adjacent the valve seat which is adjacent the inlet, a cover attached to said bottom to cover said last-mentioned space, said pressure regulator valve subassembly being attached to the top of said housing in operative relationship with the valve seat located adjacent to said inlet end, said solenoid shut-off valve actuator subassembly being attached to the top of said housing in operative relationship with the valve seat located closer to said outlet.

14. In a control manifold assembly for insertion in a gas line, a main housing of elongated shape having an inlet port at one end and an outlet port at the other end, a regulator valve seat formed in a section of said main housing adjacent said inlet port, an automatic valve seat formed in a section of said housing adjacent said outlet port, an upwardly open regulator inlet chamber connected to said inlet port, a flexible member secured in said main housing and closing the upper end of said inlet chamber, a sleeve secured to a central portion of said member, a recessed upper portion on said main housing above said flexible member, a regulator diaphragm secured over said recessed portion, a stem secured to said regulator diaphragm and extending downwardly through said sleeve, a valve member secured to the lower end of said stem and coactable with said regulator valve seat, a regulator outlet chamber in said main housing in communication with said automatic valve seat, a fluid pressure connection between said outlet chamber and the chamber formed below said diaphragm, a regulator top assembly comprising a housing securable to said main housing above said regulator diaphragm, a compression spring within said regulator top assembly housing and connected to the top of said diaphragm to bias said valve member toward open position, an automatic valve top assembly comprising a housing detachably securable to the top of said main housing alongside said regulator top assembly, an automatic valve member pivotally supported by said valve top housing and extending therebelow for coaction with said automatic valve seat, an automatic valve inlet chamber in said main housing contiguous with said regulator outlet chamber, means carried by said automatic valve top assembly housing for sealing the interior of said last-mentioned housing from said automatic valve inlet chamber, a coil enclosed by said automatic valve top assembly housing, an armature within said coil for urging said automatic valve to its open position in response to coil energization, a spring in said automatic valve top assembly housing urging said automatic valve member to its closed position, and a second automatic valve top assembly housing constructed identically with said first-mentioned automatic valve top assembly housing but having in addition an extension carrying a socket subassembly and retaining means for detachably supporting a plug-in type of pilot safety switch, and electrical connection means in said subassembly for connecting said pilot safety switch to said coil.

15. In a control manifold assembly for insertion in a gas line, a main housing of elongated shape having an inlet port at one end and an outlet port at the other end, a regulator valve seat formed in a section of said main housing adjacent said inlet port, an automatic valve seat formed in a section of said housing adjacent said outlet port, an upwardly open regulator inlet chamber connected to said inlet port, a flexible member secured in said main housing and closing the upper end of said inlet chamber, a sleeve secured to a central portion of said member, a recessed upper portion on said main housing above said flexible member, a regulator diaphragm secured over said recessed portion, a stem secured to said regulator diaphragm and extending downwardly through said sleeve, a valve member secured to the lower end of said stem and coactable with said regulator valve seat, a regulator outlet chamber in said main housing in communication with said automatic valve seat, a fluid pressure connection between said outlet chamber and the chamber formed below said diaphragm, a regulator top assembly comprising a housing securable to said main housing above said regulator diaphragm, a compression spring within said regulator top asembly housing and connected to the top of said diaphragm to bias said valve member toward open position, an automatic valve top assembly comprising a housing detachably securable to the top of said main housing alongside said regulator top assembly, an automatic valve member pivotally supported by said valve top housing and extending therebelow for coaction with said automatic valve seat, an automatic valve inlet chamber in said main housing contiguous with said regulator outlet chamber, means carried by said automatic valve top assembly housing for sealing the interior of said last-mentioned housing from said automatic valve inlet chamber, a coil enclosed by said automatic valve top assembly housing, an armature within said coil for urging said automatic valve to its open position in response to coil energization, a spring in said automatic valve top assembly housing urging said valve member to its closed position, a second valve top assembly housing constructed identically with said first-mentioned automatic valve top assembly housing but having in addition an extension carrying a socket subassembly and retaining means for detachably supporting a plug-in type of pilot safety switch, electrical connection means in said subassembly for connecting said pilot safety switch to said coil, and a second main housing constructed identically with said first main housing, the first main housing having the outlet port aligned with the inlet port at opposite ends of the housing, the second main housing having the inlet port in the end adjacent the regulator valve seat section and the outlet port in the bottom of the automatic valve seat section.

16. In a control manifold assembly for insertion in a gas line, a main housing of elongated shape having an inlet port at one end and an outlet port at the other end, a regulator valve seat formed in a section of said main housing adjacent said inlet port, an automatic valve seat formed in a section of said housing adjacent said outlet port, an upwardly open regulator inlet chamber connected to said inlet port, a flexible member secured in said main housing and closing the upper end of said inlet chamber, a sleeve secured to a central portion of said member, a recessed upper portion on said main housing above said flexible member, a regulator diaphragm secured over said recessed portion, a stem secured to said regulator diaphragm and extending downwardly through said sleeve, a valve member secured to the lower end of said stem and coactable with said regulator valve seat, a regulator outlet chamber in said main housing in communication with said automatic valve seat, a fluid pressure connection between said outlet chamber and the chamber formed below said diaphragm, a regulator top assembly comprising a housing securable to said main housing above said regulator diaphragm, a compression spring within said regulator top assembly housing and connected to the top of said diaphragm to bias the valve member toward open position, an automatic valve top assembly comprising a housing detachably securable to the top of said main housing alongside said regulator top assembly, an automatic valve member pivotally supported by said valve top housing and extending therebelow for coaction with said automatic valve seat, an automatic valve inlet chamber in said main housing contiguous with said regulator outlet chamber, means carried by said automatic valve top assembly housing for sealing the interior of said last-mentioned housing from said automatic valve inlet chamber, a coil enclosed by said automatic valve top assembly housing, an armature within said coil for urging said automatic valve to its open position in response to coil energization, a spring in said automatic valve top assembly housing urging said automatic valve member to its closed position, a second automatic valve top assembly housing constructed identically with said first-mentioned automatic valve top assembly housing but having in addition an extension carrying a socket subassembly and retaining means for detachably supporting a plug-in type of pilot safety switch, electrical connection means in said subassembly for connecting said pilot safety switch to said coil, a second main housing constructed identically with said first main housing, the first main housing having the outlet port aligned with the inlet port at opposite ends of the housing, the second main housing having the inlet port in the end adjacent the regulator valve seat section thereof and the outlet port in the bottom of the automatic valve seat section, and a manual actuator for said automatic valve detachably securable to either of said main housings.

References Cited

UNITED STATES PATENTS

| | | | |
|---|---|---|---|
| 1,191,046 | 7/1916 | Wagner | 137—584 XR |
| 2,957,518 | 10/1960 | Ray | 137—66 XR |
| 2,986,369 | 5/1961 | Flagg | 251—138 XR |
| 3,343,557 | 9/1967 | Dunn | 137—66 |

WILLIAM F. O'DEA, Primary Examiner

RICHARD GERARD, Assistant Examiner

U.S. Cl. X.R.

137—269, 505.18, 505.36, 584, 614.19; 236—21; 251—138, 366